N. B. PARSONS.
MOLDED KNOB AND METHOD OF MANUFACTURING IT.
APPLICATION FILED MAY 2, 1919.
1,355,254. Patented Oct. 12, 1920.
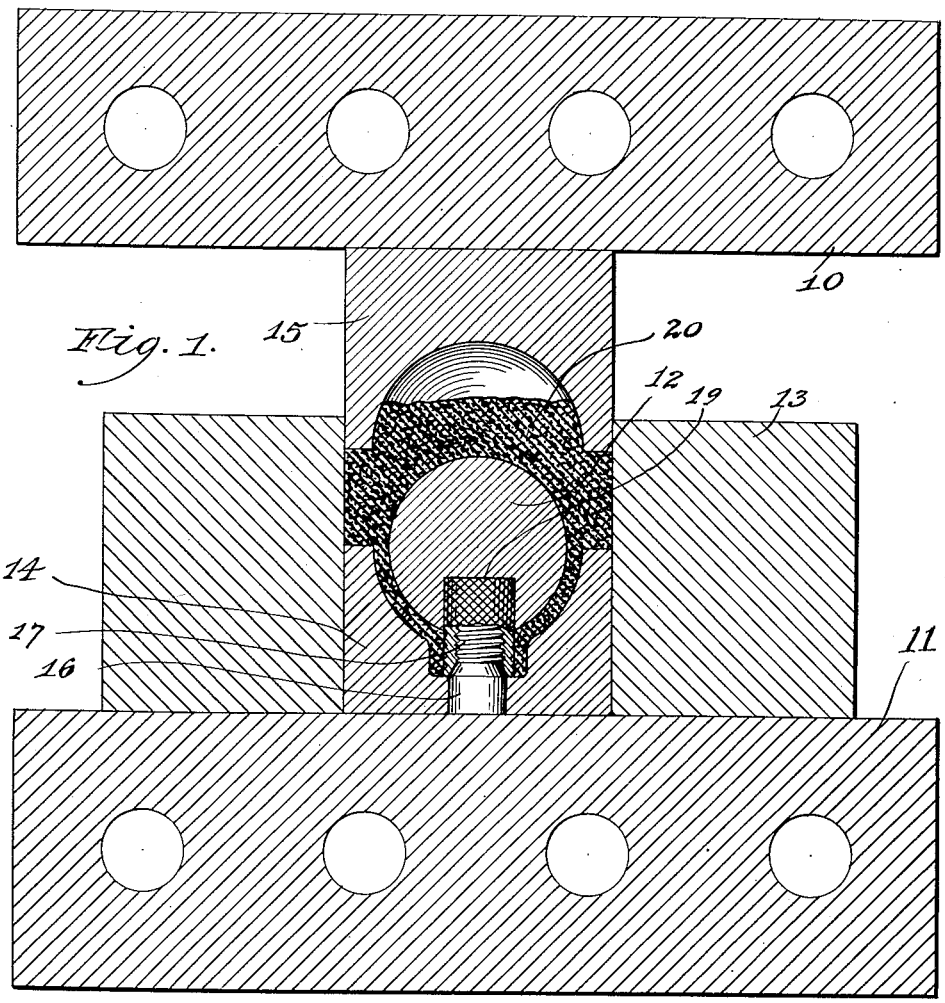
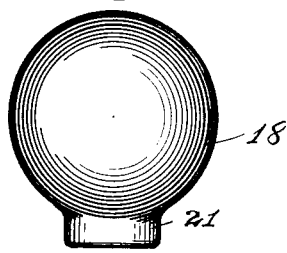
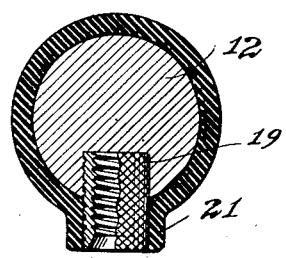

UNITED STATES PATENT OFFICE.

NEWELL B. PARSONS, OF CHICAGO, ILLINOIS, ASSIGNOR TO BELDEN MANUFACTURING COMPANY, OF CHICAGO, ILLINOIS, A CORPORATION OF ILLINOIS.

MOLDED KNOB AND METHOD OF MANUFACTURING IT.

1,355,254.     Specification of Letters Patent.     Patented Oct. 12, 1920.

Application filed May 2, 1919. Serial No. 294,239.

*To all whom it may concern:*

Be it known that I, NEWELL B. PARSONS, a citizen of the United States, residing at Chicago, in the county of Cook and State of Illinois, have invented certain new and useful Improvements in Molded Knobs and Methods of Manufacturing Them, of which the following is a specification.

This invention relates to the manufacture of molded knobs of general application, and has a specific application to the manufacture of knobs designed to be attached to a supporting plate by means of a screw thread or analogous fastening.

The principal objects of the invention are to provide a molded knob, the exterior of which shall be of a permanent finished and durable material, such as Bakelite or condensite, while utilizing a central core or filler of relatively cheap material, thereby resulting in the production of a knob costing less than a solid knob of the more expensive material; to provide a knob which is capable of being manufactured more rapidly and more economically than a solid knob constructed of the same material throughout; to provide a knob of the class described, equipped with convenient and efficient means whereby it may be attached either permanently or detachably to a stem or other support; to provide a knob which shall have great mechanical strength and rigidity and which is therefore not liable to be damaged or broken by pressure or by sudden shocks; and to provide an improved method of manufacturing such knobs.

In the accompanying drawings, which illustrate a specific application of my invention—

Figure 1 is a section through the mold and associated parts, showing the initial stage in the manufacture of one of my improved knobs;

Fig. 2 is a side elevation of a completed knob; and

Fig. 3 is a sectional view of the knob shown in Fig. 2.

In the preferred application of my invention, the moldable or plastic material which I employ is that type of material, of which Bakelite and condensite are widely known and commercially used examples. Such a material is usually made synthetically and has the property of chemically changing its physical characteristics when subjected to a high temperature. When this material is used in the form of a powder, suitable fillers being employed to act as a body or vehicle for the synthetic material, high pressure is also employed to effect the proper hardening while under the influence of high temperature, the compression also serving to force the material into the interstices of the mold or die.

In carrying out the invention, I prefer to use the usual equipment employed in the manufacture of molded articles made of condensite. Such equipment may comprise a suitable hydraulic press (not shown) equipped with an upper heating plate or block 10 and a similar lower heating block 11, the press being suitably connected to said blocks to enable them to be forced together with a pressure of several tons.

In utilizing the invention in the manufacture of spherical knobs, such as may be applied to the end of an automobile gear shift lever or brake lever, I first provide a substantially spherical core 12 of relatively cheap material, such as wood, such core being somewhat less in diameter than the diameter of the finished knob. The said core 12 is supported in the mold within which the Bakelite is compressed and heated during the molding operation. Such mold comprises an outer ring or block 13 having a cylindrical aperture bored vertically therein and serving to accommodate a lower die part 14 and an upper die part 15, the said die parts 14 and 15 being suitably bored or turned out with respect to their adjacent opposed faces so that when the die parts 14 and 15 are brought together, there will be established a substantially spherical cavity the size of the completed knob.

To support the core 12 centrally within the mold cavity, I employ means, such as a supporting pin 16, upon which the core is placed. The base of said pin 16 is cylindrical to fit removably in a similar cylindrical aperture in the bottom of the lower die 14, the upper end 17 fitting a suitable aperture in the lower end of the core. In the present instance, it is desired to have the finished knob 18 attached by a thread to the lever with which it is to be used, and therefore, the upper end of the pin 16 is threaded to correspond with the threaded end of said lever. In certain cases, instead of having the threads formed directly in the molded material, it is desirable to employ a metal insert 19 which is molded into the knob during the molding operation. Said insert 19, in its preferred form, comprises a short knurled sleeve threaded onto the end of the pin 16 and forced into a cylindrical recess in the under side of the wooden core 12.

Describing the preferred process employed in carrying out the invention, the die part 14 is placed in the bottom of the cylindrical aperture in the die-block 13 and the wooden core 12, into which has been forced the threaded sleeve 19, is screwed onto the end of the supporting pin 16, mounted in the bottom of the die part 14. Condensite 20, in powdered form and in an amount which past experience has indicated is necessary, is then placed around and over the core and within the mold cavity. The upper die part 15 is then placed over the mold material, the end of said die part 15 fitting within the cylindrical die-block aperture, all as shown in Fig. 1. The die parts thus assembled are placed between the heating blocks 10 and 11 of the hydraulic press and pressure is applied to force the blocks together.

By reason of the contact between the die parts and the heating blocks 10 and 11, heat is rapidly transferred to the mold and its parts and the condensite powder attains a temperature of several hundred degrees F., while at the same time it is subjected to a pressure of several tons. The combined heat and pressure is effective to materially compress the condensite powder which, before it changes its chemical characteristics, is converted into a plastic mass and is molded by the pressure into its finished form.

After the pressure and heat have been applied for a sufficient length of time, the die parts are removed from the press, taken apart, and the knob with the pin 16 attached is taken out. The pin 16 may then be gripped by a suitable vise or other tool, thereby enabling the knob to be unscrewed from the threaded end of the pin.

A section of the completed knob shows a material compression, i. e., a reduction in diameter of the wooden core 12, due to the pressure to which it has been subjected during the molding operation; and also shows that the walls of the cylindrical recess of the core have been forced into intimate engagement with the knurl marks on the sleeve 19, thereby locking the sleeve 19 positively and permanently into the core. It is of course unnecessary to state that the knurl marks of that portion of the sleeve which projects from the core are bonded with the molded material which forms the shank portion 21 of the knob. Thus, the sleeve 19 is effectively locked against turning movement, both with respect to the core and with respect to the shell of molded material surrounding the core.

Owing to the low conductivity and capacity for heat of the wooden core, substantially all of the heat entering the knob during the process is utilized in heating the condensite shell and thus effecting the desired chemical and physical changes in the material. This is of great importance in reducing the time required for the process, and hence results in greatly increased capacity and a corresponding reduction in cost of production. A considerable saving is also due to the fact that the use of the wooden core or filler reduces the amount of expensive condensite required, in the present instance the saving being about one-half of that required to make a solid knob of equal size.

Although this invention has been described as applied to the making of a knob of spherical shape, it is obvious that it could be applied to the manufacture of knobs of other shapes, and similar articles. The scope of the invention should therefore be determined by reference to the appended claims, which are to be construed as broadly as possible, consistent with the state of the art.

I claim—

1. As a new article of manufacture, a part comprising a core having low heat capacity, and an integral shell of heat-hardened, heat-resistant, material molded around said core.

2. A knob of the class described, comprising a non-metallic core, a threaded metal nut partially embedded in the core, and a shell of molded material surrounding the core.

3. As a new article of manufacture, a molded knob for attachment to a threaded part, said knob comprising a wooden core having diameter greater than half the diameter of the finished knob, a shell of heat-hardened, heat-resistant, material molded around said core, and a threaded sleeve seated in the core and extending through said shell.

4. The method of manufacturing knobs, which consists in supporting a non-metallic core in a mold by means of a metal support at a distance from the edges of the mold which surrounds the core, pressing plastic material all around the core and around the supporting stem, and thereafter removing the said stem.

5. The method of manufacturing threaded knobs, which consists in placing a core at the upper end of a threaded stem supported by a portion of a mold so that the core will be spaced from the edges of the mold, and in pressing a predetermined amount of plastic material around the core and stem so that a thin shell of the material will be formed around the core and around the stem, and in thereafter removing the threaded stem.

6. The method of manufacturing molded threaded knobs, which consists in supporting a wooden core on a threaded stem in one part of the mold, in applying a predetermined amount of plastic material to the mold, and in thereafter subjecting the plastic material to heat and pressure to form the material about the core and about the stem which supports the core.

7. The method of manufacturing knobs, which consists in supporting a non-metallic core in a mold part, free from the edges of the mold, in applying a predetermined amount of material which can be compressed and capable of being chemically changed by the action of heat, and in applying pressure and heat to the said material to form a thin permanent shell over the surface of the core.

8. The method of manufacturing molded knobs, which consists in providing a non-metallic core less in size than the knob itself, in forming the core with a recess on one side, inserting a metal nut in the recess, threading a stem into the nut, mounting the knob on said stem in the bottom of a mold, so that the core is at a distance from the edges of the mold, in providing a predetermined amount of moldable material, in compressing the material thus provided by means of another mold part so that the material forms a shell covering the core, thereafter removing the knob from the mold, and removing the threaded pin from the knob.

9. The method of manufacturing molded knobs, which consists in supporting a non-metallic core by means of a threaded metal pin in one of the parts of a two-part mold so that the edges of the core will be spaced in all directions from the mold surfaces, introducing a predetermined amount of plastic material between the mold parts, applying sufficient pressure to bring the mold parts together, heating the material thus compressed for a predetermined period, and thereafter removing the knob from the mold and from the supporting pin.

10. As a new article of manufacture, a molded article comprising a core having a diameter at least half of the diameter of the completed article and having low heat capacity, and an integral shell of heat-hardened, heat-resistant material molded around said core.

11. As a new article of manufacture, a molded article comprising a core substantially capable of maintaining its original shape under high compression and having low heat capacity, and an integral shell of heat-hardened, heat-resistant material molded around said core.

12. The improvement in the art of manufacturing molded articles, which consists in supporting within a mold a substantially rigid core having low heat capacity, and of less size than the mold, introducing into said mold and around said core material capable of being condensed and hardened by the action of heat and pressure, applying heat and compressing said material around said core and thereby forming a permanently hardened heat-resistant shell around said core, and subsequently removing the completed article from said mold.

NEWELL B. PARSONS.